(12) United States Patent  
Chen et al.

(10) Patent No.: US 9,270,196 B2
(45) Date of Patent: Feb. 23, 2016

(54) LOW-COST SELF-OSCILLATING DRIVER CIRCUIT

(71) Applicants: Timothy Chen, Aurora, OH (US); Daniel A. Haas, Rootstown, OH (US)

(72) Inventors: Timothy Chen, Aurora, OH (US); Daniel A. Haas, Rootstown, OH (US)

(73) Assignee: TECHNICAL CONSUMER PRODUCTS, INC., Aurora, OH (US)

( * ) Notice: Subject to any disclaimer, the term of this patent is extended or adjusted under 35 U.S.C. 154(b) by 0 days.

(21) Appl. No.: 14/333,618

(22) Filed: Jul. 17, 2014

(65) Prior Publication Data

US 2015/0349659 A1  Dec. 3, 2015

Related U.S. Application Data

(60) Provisional application No. 62/004,615, filed on May 29, 2014.

(51) Int. Cl.
| | |
|---|---|
| *H05B 37/02* | (2006.01) |
| *H02M 7/06* | (2006.01) |
| *H05B 33/08* | (2006.01) |
| *H02M 1/36* | (2007.01) |
| *H02M 1/44* | (2007.01) |

(52) U.S. Cl.
CPC ............ *H02M 7/06* (2013.01); *H02M 1/36* (2013.01); *H02M 1/44* (2013.01); *H05B 33/0809* (2013.01)

(58) Field of Classification Search
USPC .......... 315/224, 225, 226, 276, 278, 283, 291
See application file for complete search history.

(56) References Cited

U.S. PATENT DOCUMENTS

| | | | |
|---|---|---|---|
| 4,716,357 A | 12/1987 | Cooper | |
| 5,475,580 A * | 12/1995 | Noro | ............................... 363/24 |
| 6,169,374 B1 | 1/2001 | Chang | |
| 6,400,584 B1 * | 6/2002 | Sabate et al. | ..................... 363/22 |
| 8,487,551 B1 | 7/2013 | Chen et al. | |
| 8,723,428 B2 * | 5/2014 | Yao | ............................... 315/177 |
| 2011/0057573 A1 | 3/2011 | Jutras et al. | |

OTHER PUBLICATIONS

PCT, International Search Report and Written Opinion; Patent Application No. PCT/US2015/031322 (Aug. 19, 2015).

* cited by examiner

*Primary Examiner* — Thuy Vinh Tran
(74) *Attorney, Agent, or Firm* — Thompson Hine LLP

(57) ABSTRACT

A driver circuit for powering a load is disclosed. The driver circuit includes a self-oscillating half-bridge circuit, a resonant driver in electrical communication with the self-oscillating half-bridge circuit, and a DC voltage supply in electrical communication with the resonant driver. The self-oscillating half-bridge circuit is configured to generate a high-frequency AC signal. The resonant driver is configured to limit a current of the high-frequency AC signal and produce a limited output voltage based on the high-frequency AC signal. The DC voltage supply is configured to rectify the limited output voltage into a DC output voltage including a substantially constant current for powering the load.

24 Claims, 7 Drawing Sheets

LOW-COST SELF-OSCILLATING DRIVER CIRCUIT

RELATED APPLICATIONS

This application claims the benefit of U.S. Provisional Application No. 62/004,615, filed on May 29, 2014.

TECHNICAL FIELD

The present disclosure relates generally to a driver circuit for powering a load, and more particularly to a driver circuit including a resonant driver and a DC voltage supply that rectifies a limited output voltage into a substantially constant current for powering the load.

BACKGROUND

Light emitting diode (LED) based lighting systems may offer several energy and reliability advantages over other types of lighting systems such as, for example, incandescent or fluorescent lighting. Thus, LED based lighting systems may be used to replace other existing lighting technologies. Some types of LED drive circuits may include a controller integrated circuit (IC) in combination with a metal-oxide-semiconductor field-effect transistor (MOSFET) for driving one or more LEDs. However, components such as controller ICs and MOSFETs are typically expensive, and add cost and complexity to an LED lamp. Therefore, there exists a continuing need in the art for a cost-effective drive circuit for an LED lamp.

SUMMARY

In one embodiment, a driver circuit for powering a load is disclosed. The driver circuit includes a self-oscillating half-bridge circuit, a resonant driver in electrical communication with the self-oscillating half-bridge circuit, and a DC voltage supply in electrical communication with the resonant driver. The self-oscillating half-bridge circuit is configured to generate a high-frequency AC signal. The resonant driver is configured to limit a current of the high-frequency AC signal and produce a limited output voltage based on the high-frequency AC signal. The DC voltage supply is configured to rectify the limited output voltage into a DC output voltage including a substantially constant current for powering the load.

In another embodiment, a driver circuit for powering at least one light emitting diode (LED) in a non-dimming application is disclosed. The driver circuit includes a self-oscillating half-bridge circuit, a resonant driver in electrical communication with the self-oscillating half-bridge circuit, and a DC voltage supply in electrical communication with the resonant driver. The self-oscillating half-bridge circuit is configured to generate a high-frequency AC signal, and includes an upper switching element and a lower switching element that are connected in a cascade arrangement. The resonant driver is configured to limit a current of the high-frequency AC signal and produce a limited output voltage based on the high-frequency AC signal. The DC voltage supply is configured to rectify the limited output voltage into a DC output voltage including a substantially constant current for powering the LED.

DETAILED DESCRIPTION

Figure 1:
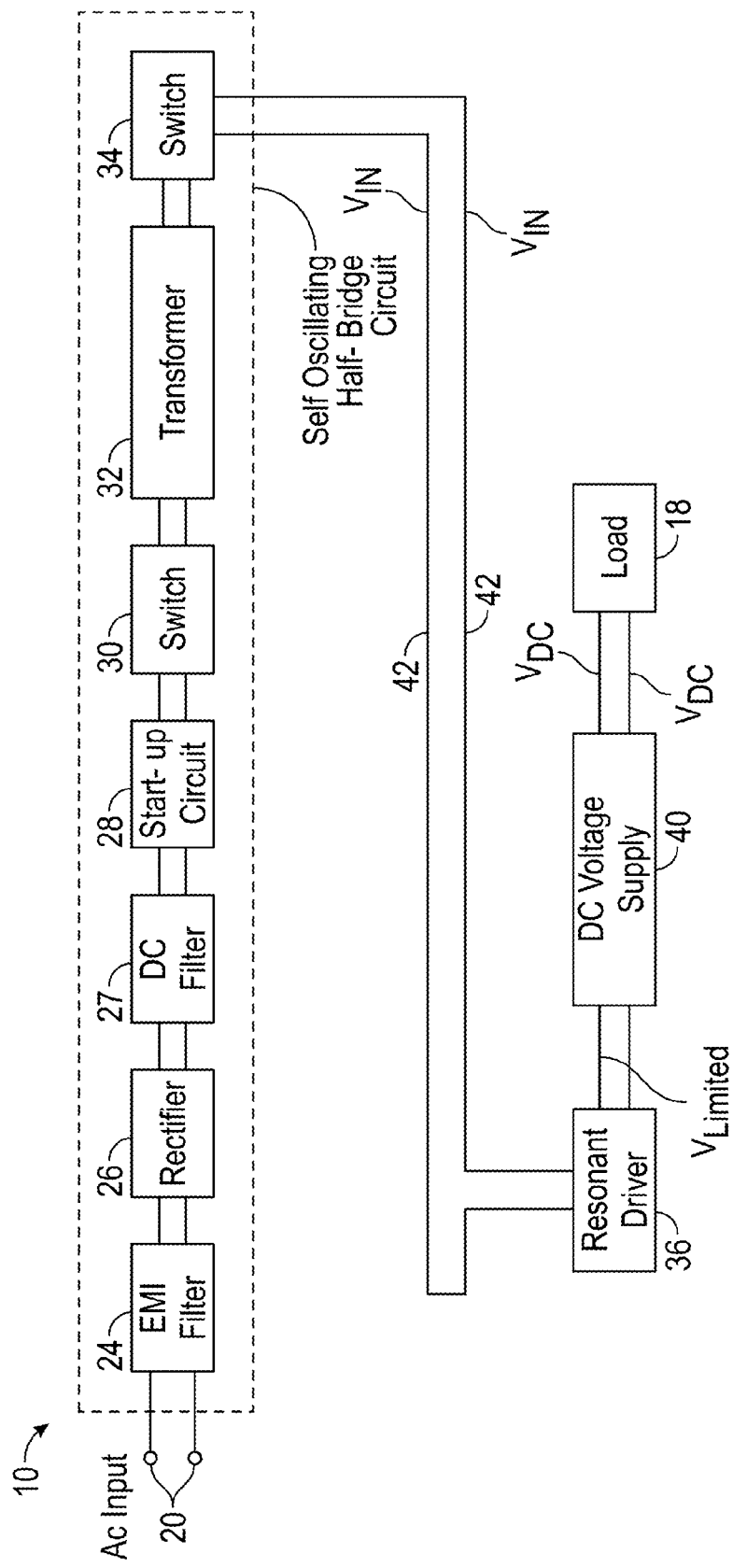
FIG. 1 is an exemplary block diagram of a circuit for providing DC current to a load.

The following detailed description will illustrate the general principles of the invention, examples of which are additionally illustrated in the accompanying drawings. In the drawings, like reference numbers indicate identical or functionally similar elements.

Figure 2:
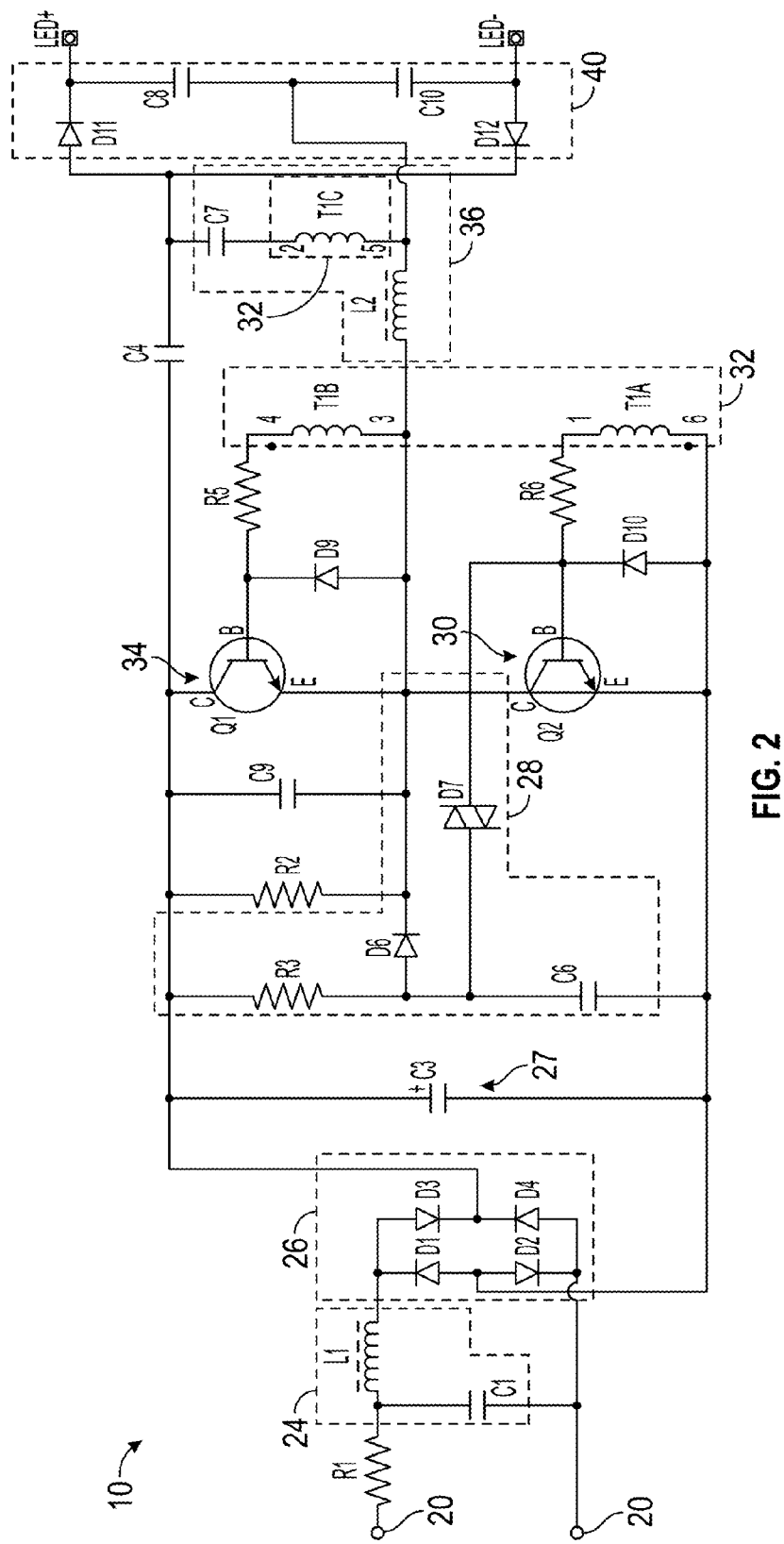
FIG. 2 is an exemplary circuit diagram of the circuit shown in FIG. 1, where a DC voltage supply is a high frequency voltage doubler.
Figure 5:
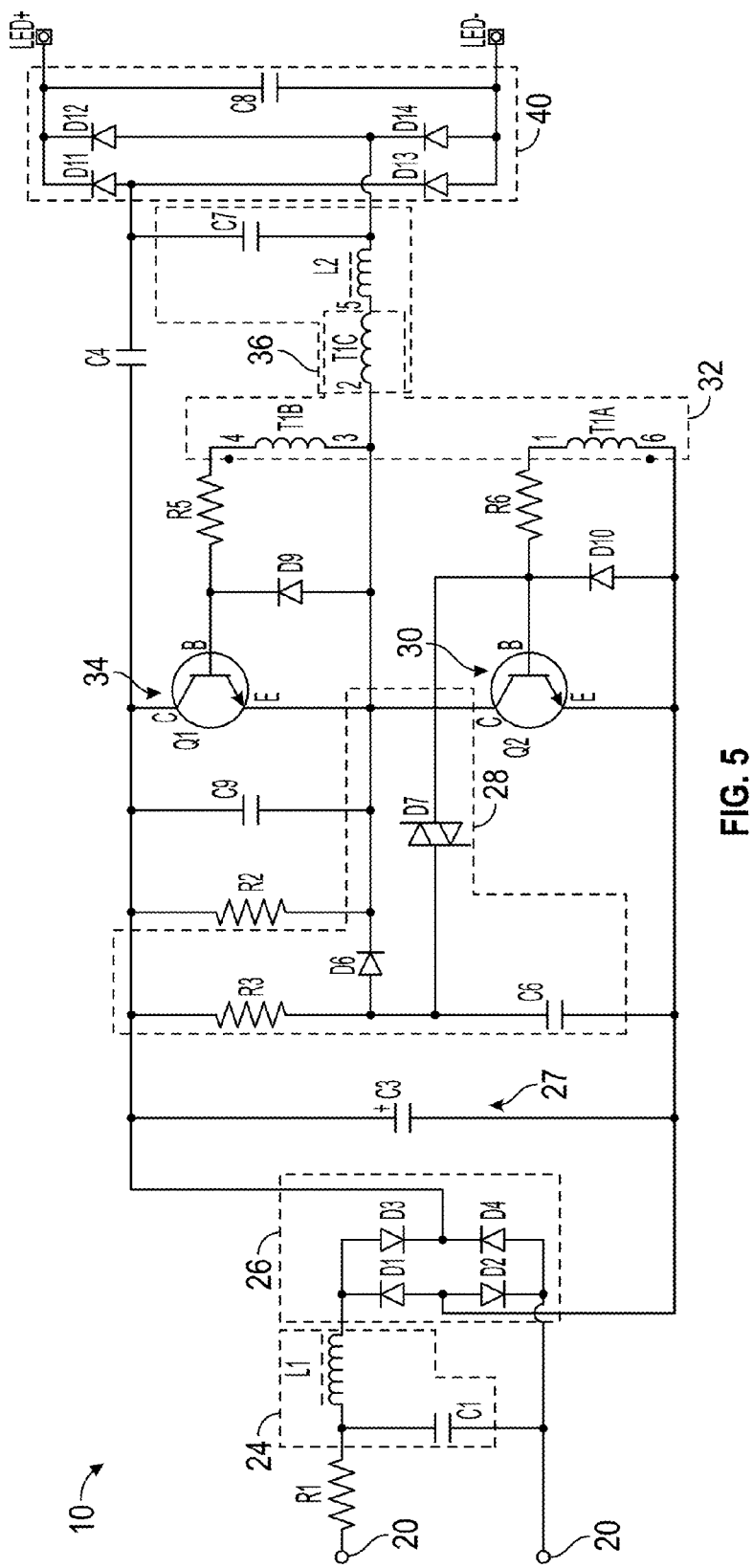
FIG. 5 is yet another embodiment of the circuit diagram shown in FIG. 2, where the DC voltage supply is a full wave rectifier.
Figure 6:
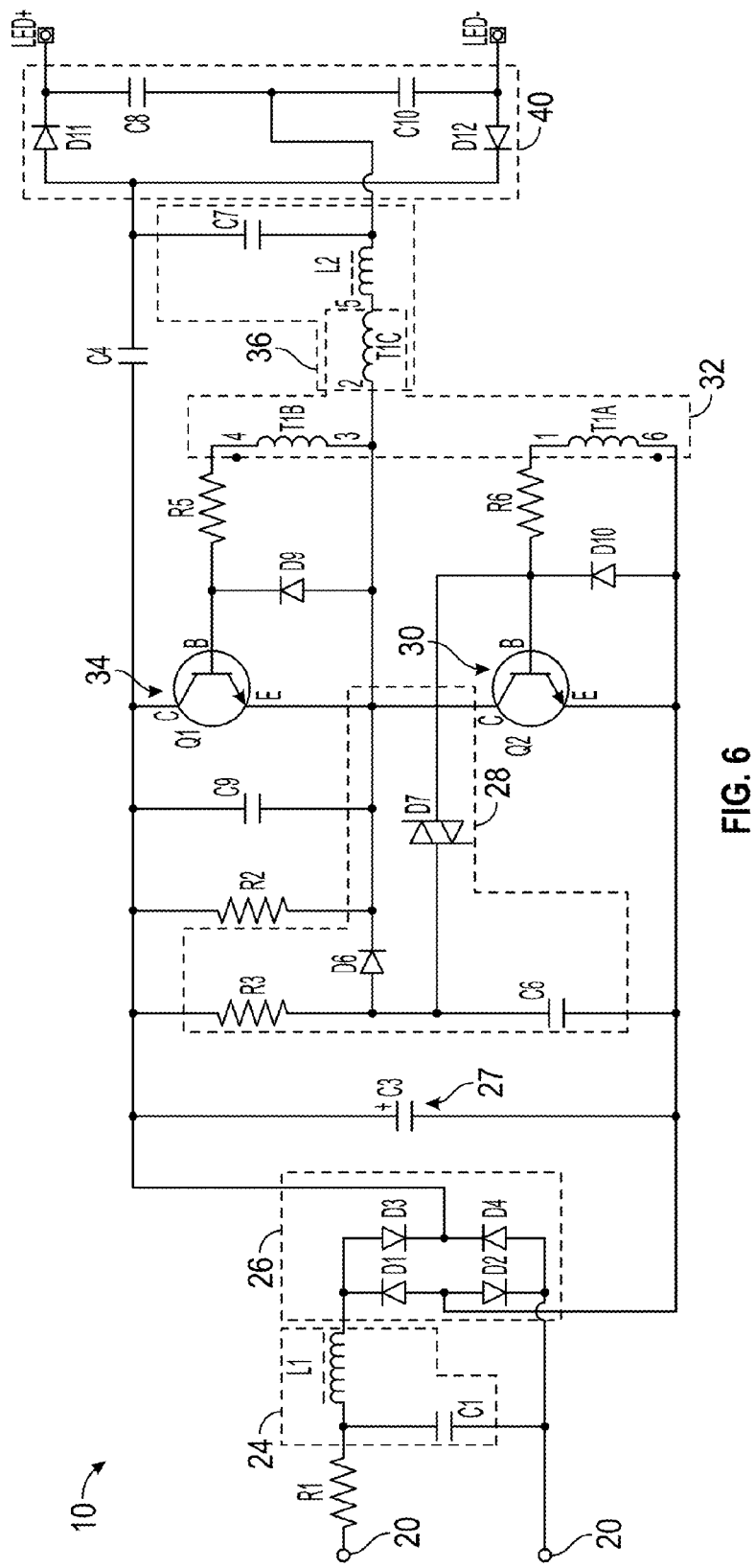
FIG. 6 is still another embodiment of the circuit diagram shown in FIG. 2, where the DC voltage supply is a high frequency voltage doubler.

FIG. 1 is an exemplary block diagram of a circuit 10 for providing DC current to a load 18. The driver circuit 10 may include a pair of power input lines 20 for connection to a source (not shown) of AC power such as, for example, main power lines at a nominal 120 volts AC. The driver circuit 10 may also include a resistor R1 (FIG. 2), an electromagnetic interference (EMI) filter 24, a rectifier 26, a DC filter 27, a start-up circuit 28, a switch 30, a transformer 32, a switch 34, a resonant driver circuit 36, and a DC voltage supply 40. The DC voltage supply 40 may be either a high frequency voltage doubler (which is illustrated in FIGS. 2 and 6) or full wave rectifier (illustrated in FIGS. 3-5), which are explained in greater detail below. The EMI filter 24, rectifier 26, DC filter 27, start-up circuit 28, switch 30, transformer 32, and switch 34 may define a self-oscillating half-bridge circuit.

Referring to FIGS. 1-2, the self-oscillating half-bridge circuit typically includes an upper and lower switch that are connected in a cascade arrangement. In the embodiment as shown in FIG. 2, the switch 30 is a lower switch Q2, and the switch 34 is an upper switch Q1. The self-oscillating half-bridge circuit is configured to generate a high-frequency AC signal $V_{IN}$ (shown in FIG. 1). In one embodiment, the high-frequency AC signal $V_{IN}$ may be an AC signal having a frequency of at least about 40 kilohertz (kHz). An output 42 of the self-oscillating half-bridge circuit may be in electrical communication with the resonant driver circuit 36. The resonant driver circuit 36 may be in electrical communication with the DC voltage supply 40. The DC voltage supply 40 is used to provide rectified DC power to the load 18. In particular, the DC voltage supply 40 may be used to provide substantially constant current to the load 18.

In one embodiment, the load 18 may be one or more light emitting diodes (LEDs). For example, in embodiments as shown in FIGS. 2-6 the circuit 10 may include a pair of output terminals 44 that connect to a LED (not shown). In the embodiments as described and illustrated in the figures, the driver circuit 10 is used in a non-dimmable LED application. Although an LED is described, it is to be understood that the load 18 may be any type of device that requires a substantially constant current during operation. For example, in an alternative embodiment, the load 18 may be a heating element.

Referring to both FIGS. 1 and 2, the input lines 20 of the driver circuit 10 may be in electrical communication with the EMI filter 24. In one non-limiting embodiment the EMI filter 24 may include an inductor L1 and a capacitor C1 (shown in FIG. 2). The rectifier 26 may be in electrical communication with the EMI filter 26, and is configured to convert incoming AC power from the EMI filter 24 to a pulsing DC power. Although the rectifier 26 is shown as a full wave diode bridge rectifier, those skilled in the art will readily appreciate that any type of full wave rectifier may be used as well. The output of the rectifier 26 may be in electrical communication with a DC filter 27. In the exemplary embodiment as shown in FIG. 2, the DC filter 27 may include a capacitor C3.

The DC filter 27 may be in electrical communication with the start-up circuit 28. In an embodiment, the start-up circuit 28 may include resistor R3, diode D6, diac D7, and capacitor C6. The diac D7 is a diode that conducts current only after a breakover voltage, $V_{BO}$, has been reached. During initial start-up of the circuit 10, the capacitor C6 may be charged until the diac D7 reaches the breakover voltage $V_{BO}$. Once the breakover voltage is reached, the diac D7 may start to conduct current. Specifically, the diac D7 may be connected to and sends current to the switch 30. Once the diac D7 attains the breakover voltage $V_{BO}$, the diode D6 may be used to discharge the capacitor C6 and to prevent the diac D7 from firing again.

Continuing to refer to both FIGS. 1 and 2, a resistor R2 may be used to provide bias to the lower switching element Q2. In the embodiment as shown in FIG. 2, the switching element Q2 is a bipolar junction transistor (BJT). Although a BJT may be a relatively economical and cost-effective component used for switching, those skilled in the art will appreciate that other types of switching elements may be used as well. As seen in FIG. 2, a diode D10 may be provided to limit negative voltage between a base B and an emitter E of the switching element Q2, which in turn increases efficiency.

The switch 30 may be connected to the transformer 32. As seen in FIG. 2, in an embodiment the transformer 32 includes three windings, T1A, T1B, and T1C. The winding T1A may include an opposite polarity when compared to the winding T1B. This ensures that if the switching element Q2 is turned on, another switching element Q1 will not turn on at the same time.

Continuing to refer to FIG. 2, the upper switching element Q1 may also be a BJT. A diode D9 may be provided to limit negative voltage between a base B and an emitter E of the upper switching element Q1, which in turn increases efficiency. The switch 34 electrically connects the self-oscillating half-bridge circuit to the resonant drive circuit 36. In the embodiment as shown in FIG. 2, the resonant drive circuit 36 may include a capacitor C7 connected in series with the winding T1C of the transformer 32. The resonant drive circuit 36 may also include an inductor L2. The resonant drive circuit 36 may be used to limit the current received from the self-oscillating half-bridge circuit, and produce a limited output voltage $V_{LIMITED}$ (shown in FIG. 1) which is based on the high-frequency AC signal $V_{IN}$ from the self-oscillating half-bridge circuit. The limited output voltage $V_{LIMITED}$ may be rectified into a DC output voltage $V_{DC}$ (shown in FIG. 1) that is supplied to the load 18. The DC output voltage $V_{DC}$ includes a substantially constant current.

Figure 7:
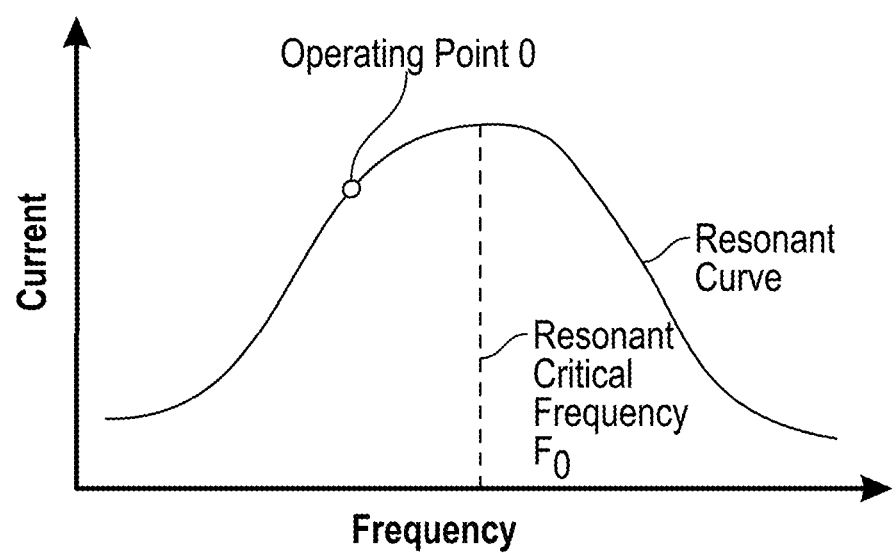
FIG. 7 is an illustration of a resonant curve and an operating point of the resonance driver illustrated in FIG. 2.

FIG. 7 is an illustration of an exemplary resonance curve of the resonant drive circuit 36 shown in FIG. 2. The resonance curve may include an operating point O and a resonant critical frequency $f_o$. The critical frequency $f_o$ is located at a peak of the resonance curve, and the operating point O is located to the left of the critical frequency $f_o$. Referring to both FIGS. 2 and 7, increasing the capacitance of the capacitor C7 or the inductance of the inductor L2 may shift the critical frequency $f_o$ to the left, and decrease the capacitance of the capacitor C7 or the inductance of the inductor L2 may shift the critical frequency $f_o$ to the right. The frequency of oscillation of the resonance curve may be determined by winding T1C of the transformer 32, resistors R5 and R6, the upper switching element Q1, and the lower switching element Q2. In particular, the frequency of oscillation of the resonance curve may be based upon a number of the turns of the winding T1C of the transformer 32, as well as the storage times of the upper switching element Q1 and the lower switching element Q2.

The inductance of the inductor L2 as well as the capacitance of the capacitors C7 and a capacitor C4 may be key factors in maintaining acceptable line regulation of the circuit 10. Specifically, as line voltage increases a frequency of operation of the circuit 10 decreases. Moreover, the impendence of the inductor L2 may decrease as the frequency of operation decreases, thereby causing an increase in current that is delivered to the load 18 (FIG. 1). Thus, the inductance of the inductor L2 as well as the capacitance of the capacitors C7 and the capacitor C4 may be selected such that an overall gain of the circuit 10 decreases as the frequency of operation decreases. This in turn may substantially decreases or minimize any increase in current that is delivered to the load 18 as the line voltage increases.

Figure 4:
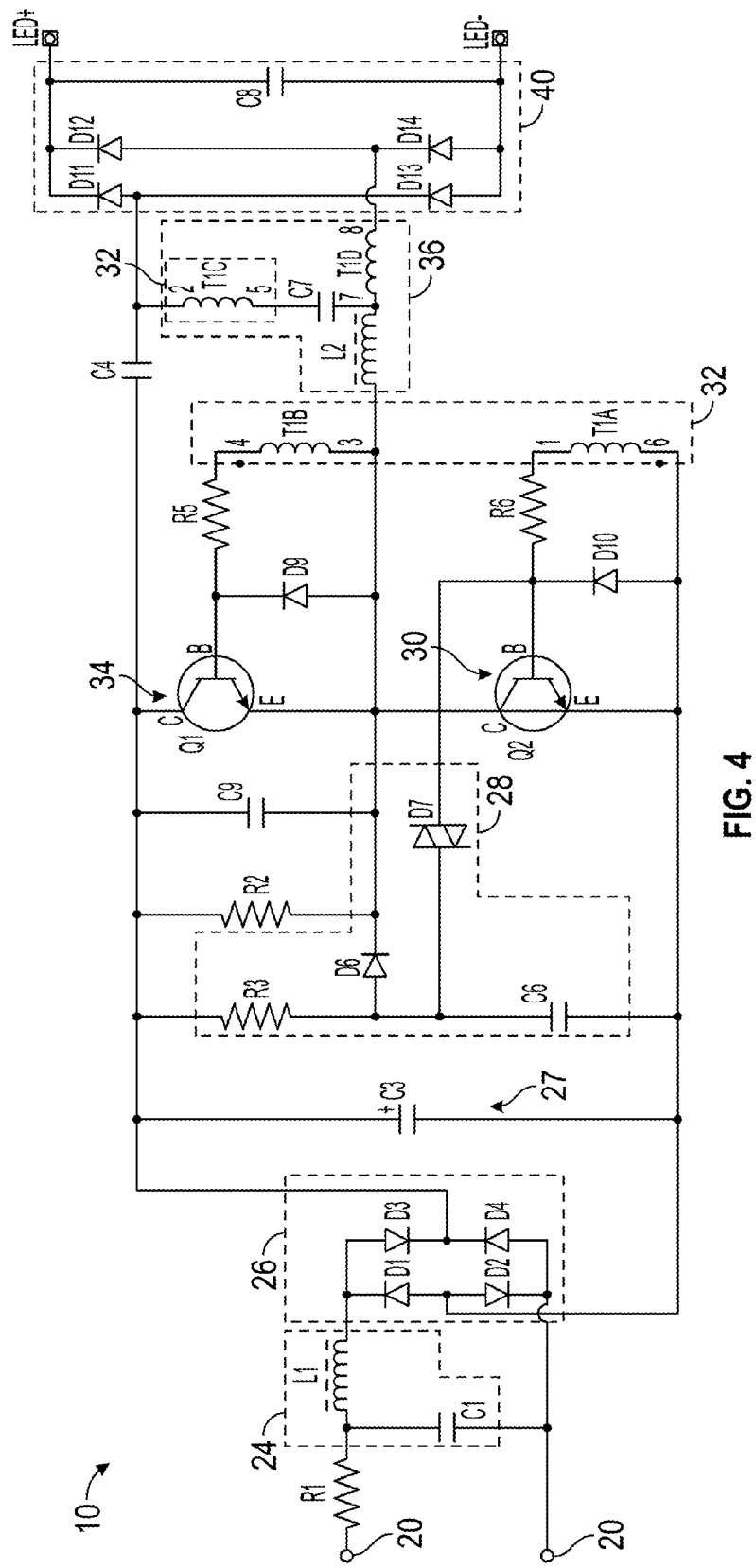
FIG. 4 is another embodiment of the circuit diagram shown in FIG. 2, where the DC voltage supply is a full wave rectifier and a resonant drive circuit includes a buck winding.

Turning back to FIGS. 1-2, the resonant drive circuit 36 may be connected in parallel with the load 18 in order to enhance overall efficiency of the circuit 10. Although FIG. 2 illustrates the resonant drive circuit 36 including the capacitor C7 connected in series with the winding T1C of the transformer 32, it is to be understood that the resonant drive circuit 36 may include other configurations as well. For example, in the embodiment as shown in FIG. 4, the resonant drive circuit 36 may include a fourth winding or a buck winding T1D that is connected in series with a bridge rectifier (the bridge rectifier is described in greater detail below). The buck winding T1D may be used to buck or step down current through the winding T1C of the transformer 32. In the embodiment as shown in FIG. 5, the winding T1C of the transformer 32 may be connected to the inductor L2 in series. Moreover, in the embodiment as shown in FIG. 6 the winding T1C of the transformer 32 is also connected to the inductor L2 in series.

Referring to FIG. 1, the resonant drive circuit 36 may be in electrical communication with the DC voltage supply 40. The DC voltage supply 40 may rectify the limited output voltage $V_{LIMITED}$ from the resonant drive circuit 36 into the DC output voltage $V_{DC}$. In the embodiment as shown in both FIGS. 2 and 6, the DC voltage supply 40 is a high frequency voltage doubler. The high frequency voltage doubler may include two diodes D11 and D12 and two capacitors C8 and C10 that are arranged in a voltage double. In an embodiment, the two diodes D11 and D12 may be low voltage diodes having a breakdown voltage that may range from about 200 Volts to about 400 Volts. This means that at relatively low voltages (e.g., between 200 Volts and 400 Volts) breakdown of the two diodes D11 and D12 may occur, which in turn enhances the safety of the circuit 10. Specifically, if one of the two diodes D11 and D12 opens, or if an LED (not illustrated) that the circuit 10 is driving opens to create an open circuit condition, it may be beneficial to have a relatively low current flow for safety reasons.

The high frequency voltage doubler may be used to convert the high frequency output of the resonant drive circuit 36 (e.g., the limited output voltage $V_{LIMITED}$) into the DC output voltage $V_{DC}$. The DC output voltage $V_{DC}$ may be equal to a peak-to-peak value of a sinusoidal waveform of the limited output voltage $V_{LIMITED}$ received from the resonant drive circuit 36. In other words, the two diodes D11 and D12 and two capacitors C8 and C10 work together to effectively double the limited output voltage $V_{LIMITED}$ from the resonant circuit 36.

Figure 3:
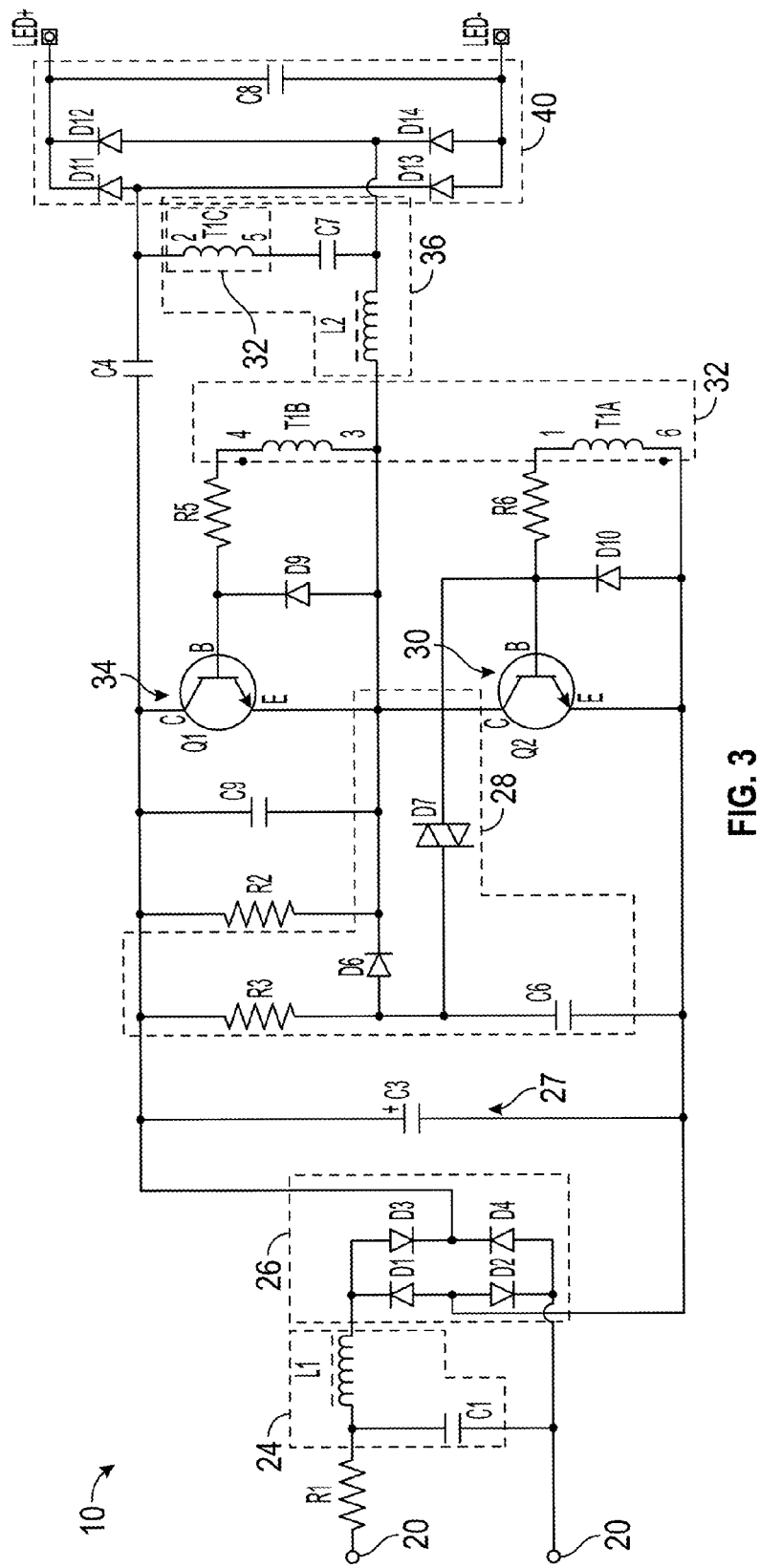
FIG. 3 is an alternative embodiment of the circuit diagram shown in FIG. 2, where the DC voltage supply is a full wave rectifier.

In the embodiments as shown in FIGS. 3-5, the DC voltage supply 40 is a full wave rectifier. The full wave rectifier may include four diodes D11-D14. The DC voltage supply 40 may also include a filter capacitor C8. The full-wave rectifier may be connected in parallel with the filter capacitor C8. Similar to the embodiments as shown in FIGS. 2 and 6, the diodes D11-D14 may be low voltage diodes. It is to be understood that the full wave rectifier 40 doubles the frequency of limited output voltage $V_{LIMITED}$ from the resonant circuit 36, therefore the filter capacitor C8 may be relatively small in size. For example, in one embodiment, the filter capacitor C8 may be less than one microfarad.

The disclosed circuit 10 as illustrated in FIGS. 1-6 and described above provides a relatively low-cost and efficient approach for driving a load. Some types of LED lamps currently available may utilize a controller IC or one or more MOSFETS in order to provide substantially constant current to a load. These types of components may be relatively expensive, and increases the cost of the overall circuit. In contrast, the disclosed circuit 10 does not utilize a controller IC. In some embodiments, the disclosed circuit may also utilize relatively inexpensive BJTs instead of MOSFETs in order to drive an LED, which also reduces overall cost of the disclosed circuit 10. Moreover, the disclosed circuit 10 may require fewer components when compared to some types of LED driver circuits currently available. This is also beneficial, as fewer components may in turn provide enhanced reliability.

While the forms of apparatus and methods herein described constitute preferred embodiments of this invention, it is to be understood that the invention is not limited to these precise forms of apparatus and methods, and the changes may be made therein without departing from the scope of the invention.

What is claimed is:

1. A driver circuit for powering a load, comprising:
a self-oscillating half-bridge circuit generating a high-frequency AC signal, wherein the self-oscillating half-bridge circuit comprises a transformer including a first winding, a second winding, and a third winding, and wherein the first winding and the second winding include opposite polarities;
a resonant driver in electrical communication with the self-oscillating half-bridge circuit, the resonant driver circuit limiting a current of the high-frequency AC signal and produce a limited output voltage based on the high-frequency AC signal, the resonant driver including a capacitor connected directly to the third winding of the transformer in series, wherein the capacitor and the third winding of the transformer are connected in parallel with the load; and
a DC voltage supply in electrical communication with the resonant driver rectifying the limited output voltage into a DC output voltage including a substantially constant current for powering the load.

2. The driver circuit recited in claim 1, wherein the DC voltage supply is a voltage doubler that includes two diodes and two capacitors, and wherein the voltage doubler doubles the limited output voltage from the resonant driver.

3. The driver circuit recited in claim 2, wherein the two diodes are low voltage diodes having a breakdown voltage ranging from about 200 Volts to about 400 Volts.

4. The driver circuit recited in claim 1, wherein the DC voltage supply includes a full wave rectifier and a filter capacitor.

5. The driver circuit recited in claim 4, wherein the filter capacitor is about one microfarad.

6. The driver circuit recited in claim 5, wherein the full wave rectifier doubles a frequency of the limited output voltage from the resonant driver.

7. The driver circuit recited in claim 1, wherein the self-oscillating half-bridge circuit includes an upper switching element and a lower switching element that are connected in a cascade arrangement.

8. The driver circuit recited in claim 7, wherein the upper switching element and the lower switching element are both bipolar junction transistors (BJTs).

9. The driver circuit recited in claim 1, wherein the self-oscillating half-bridge circuit has a start-up circuit that is comprised of a resistor, a diode, a diac, and a capacitor.

10. The driver circuit recited in claim 9, wherein the capacitor of the start-up circuit is charged during an initial start-up of the driver circuit until the diac reaches a breakover voltage.

11. The driver circuit recited in claim 1, the resonant driver including an inductor, and wherein an inductance of the inductor and a capacitance of the capacitor are selected such that as an overall gain of the resonant driver decreases a frequency of operation also decreases.

12. The driver circuit recited in claim 11, wherein the resonant driver further includes a buck winding that steps down a second current flowing through the third winding of the transformer.

13. A driver circuit for powering at least one light emitting diode (LED) in a non-dimming application, comprising:
a self-oscillating half-bridge circuit generating a high-frequency AC signal, the self-oscillating half-bridge circuit including an upper switching element and a lower switching element that are connected in a cascade arrangement and a transformer including a first winding, a second winding, and a third winding, and wherein the first winding and the second winding include opposite polarities;
a resonant driver in electrical communication with the self-oscillating half-bridge circuit, the resonant driver circuit limiting a current of the high-frequency AC signal and produce a limited output voltage based on the high-frequency AC signal, the resonant driver including a capacitor connected directly to the third winding of the transformer in series, wherein the capacitor and the third winding of the transformer are connected in parallel with the at least one LED; and
a DC voltage supply in electrical communication with the resonant driver and rectifying the limited output voltage into a DC output voltage including a substantially constant current for powering the at least one LED.

14. The driver circuit recited in claim 13, wherein the DC voltage supply is a voltage doubler that includes two diodes and two capacitors.

15. The driver circuit recited in claim 14, wherein the two diodes are low voltage diodes having a breakdown voltage ranging from about 200 Volts to about 400 Volts.

16. The driver circuit recited in claim 14, wherein the voltage doubler doubles the limited output voltage from the resonant driver.

17. The driver circuit recited in claim 13, wherein the DC voltage supply includes a full wave rectifier and a filter capacitor.

18. The driver circuit recited in claim 17, wherein the filter capacitor is about one microfarad.

19. The driver circuit recited in claim 17, wherein the full wave rectifier doubles a frequency of the limited output voltage from the resonant driver.

20. The driver circuit recited in claim 13, wherein the upper switching element and the lower switching element are both bipolar junction transistors (BJTs).

21. The driver circuit recited in claim 13, the resonant driver including an inductor, and wherein an inductance of the inductor and a capacitance of the capacitor are selected such that as an overall gain of the resonant driver decreases a frequency of operation also decreases.

22. The driver circuit recited in claim 21, wherein the resonant driver further includes a buck winding that steps down a second current flowing through the third winding of the transformer.

23. A driver circuit for powering a load, comprising:
- a self-oscillating half-bridge circuit to generate a high-frequency AC signal, wherein the self-oscillating half-bridge circuit has a start-up circuit that is comprised of a resistor, a diode, a diac, and a capacitor;
- a resonant driver in electrical communication with the self-oscillating half-bridge circuit, the resonant driver circuit limiting a current of the high-frequency AC signal and produce a limited output voltage based on the high-frequency AC signal; and
- a DC voltage supply in electrical communication with the resonant driver to rectify the limited output voltage into a DC output voltage including a substantially constant current for powering the load.

24. The driver circuit recited in claim 23, wherein the capacitor of the start-up circuit is charged during an initial start-up of the driver circuit until the diac reaches a breakover voltage.

* * * * *